Patented Mar. 14, 1944

2,344,085

UNITED STATES PATENT OFFICE 2,344,085

PROCESS FOR THE POLYMERIZATION OF ALKOXY-BUTADIENES

Paul Halbig, Freiburg, Switzerland, and Friedrich Matthias and Alfred Treibs, Munich, Germany; vested in the Alien Property Custodian No Drawing. Application August 23, 1940, Serial No. 353,982. In Germany August 24, 1939

2 Claims. (Cl. 260—78)

This invention relates to the polymerization of butadienes and especially to ethers of monohydroxy-butadiene -1,3. In accordance with the preferred embodiments of the invention, it pertains to the polymerization of alkoxybutadienes and has for its object to provide a new and improved process for this purpose.

The addition of alcohols to vinylacetylene is known. Thereby products were obtained being interpreted partly as butine derivatives, partly as allene derivatives and partly as alkoxy-2-butadienes. Useful polymers could not yet be produced out of these compounds. Experiments of polymerization were nearly always negative, compare e. g. Rothenberg Zentralblatt 1936, II, p. 1895.

We have now found, applying potassium alcoholate as catalyst, a new class of alcohol addition products of vinylacetylene not known until now which surprisingly polymerizes easily. They have, as stated by us, the constitution of alkoxy-1-budadiene-1,3 of the general formula $$RO.CH=CH-CH=CH_2$$

where RO may be any kind of alcohol. By discovering effective catalysts used successfully for alkoxy-1-butadienes, we were able to realize the polymerization of alkoxy-2-butadienes. Mixtures of 1- and 2-alkoxy-butadienes are also polymerizable.

Specially suitable polymerization catalysts are capillary active substances like above all clay, kaolin and capillary active hydrosilicates known for example under the name of Tonsil, Frankonit, Floridin and the like. The polymerization is not accelerated by all of these substances, active carbon and silica gel scarcely act. As polymerization catalysts quite different substances however also may be used, especially some metal chlorides like FeCl₃, AlCl₃, ZnCl₂ and boron fluoride. Acids like hydrochloride acid, sulfuric acid, nitric acid, phosphorus pentoxyde also cause polymerization. Elementary oxygen and the known peroxide accelerators catalyze the polymerization. Moreover the polymers themselves are polymerization catalysts. These catalysts can be employed as suspensions or solutions.

The properties of the polymerization products may be largely varied by means of the numerous methods applied in the art of polymerization of to-day, according to the intended use. Such means are for example the polymerization at defined temperatures with or without any solvents, the polymerization of the monomeric compound in an emulsified state, the polymerization of the monomeric compound with other polymerizable substances or with substances not polymerizing per se, the polymerization in the presence of polymers of other substances and the variation of the amount and composition of the polymerization catalysts, and so on.

It is particularly noteworthy within the scope of this invention that the alkoxy-1-butadiene may be polymerized along with substances which are polymerizable per se, such as acrylic nitril, 1- and 2-acetoxy-butadiene, and linseed oil; this type material may similarly be polymerizable with such substances as maleic anhydride which polymerize under special conditions. Prior attempts to react alkoxy-2-butadiene with maleic acid anhydride, apparently with the intention to perform a "diene-synthesis" has resulted in a dark resin produced by violent reaction. By the method of operation disclosed herein, however, light elastic interpolymers are obtained with 1- and 2-alkoxy butadiene which according to the presence of functional groups may further be converted into derivatives of carbon acids. Partly the polymers are also oils with drying properties. In many cases the polymers are rubberlike, that is they are vulcanizable; they can chiefly be applied in the lacquer-industry and for artificial resins. The interpolymers comprise the whole scope of artificial resins which are oil-like, rubber-like and resin-like.

Example 1

0.1 g. of fine powdered kaolin are added to 10 g. of ethoxybutadiene at room temperature. The polymerization begins slowly; the temperature rises and solid polymerization products are precipitated. The temperature rises to the boiling point and the heat is removed by cooling. After a few minutes the polymerization is finished. The polymer is a colorless to slightly yellow, rubber-like and slightly sticky mass which can be vulcanized by sulfur or other suitable means.

The ability of polymerizing depends on the purity of the ethoxy-butadiene, that is the inclination of the product to polymerize increases with the increasing purity of the product. Butadiene ethers too react in the same way. The activity of the catalyst may be increased by previous heating; unglazed, burnt clay is a suitable catalyst too. The polymerization with pure substances and high active kaolin, used as catalyst, proceeds so violently that larger amounts overheat themselves up to the point of decomposition, if the reaction heat is not removed. The thus obtained polymers are for the most part very high molecular and unsoluble but swellable in solvents. Low molecular constituents can be extracted by ether. The course of the polymerization may be moderated by the addition of solvents.

In the same way alkyl-homologs of the ethoxy-1-butadiene may be polymerized for example, methoxy-, propoxy-, butoxy-butadiene and the like. The polymerization is scarcely influenced by antioxidation catalysts as for example hydroquinone. The methoxy-1-butadiene, boiling point: 87.5° C./703 mm. $D_4^{20}$: 0.8296, polymerizes somewhat more slowly than the ethyl derivative which shows the greatest ability of polymerizing. The polymerization velocity of the ethers with higher alkyl groups decreases when the alkyl groups increase.

Example 2

In a vessel, equipped with a stirrer, 50 parts by weight of benzene together with 0.6 part by weight of kaolin are heated up to the boiling point and a mixture of 10 parts by weight of ethoxy-1-butadiene and 30 parts by weight of benzene are added dropwise. After 15 minutes a white gel-like mass begins to precipitate. The reaction is completed after another hour. The solvent may be removed by water, steam or by distillation. The remaining polymer is a nearly colorless, elastic mass. Instead of benzene other solvents such as ethyl acetate, carbon tetrachloride, methylene chloride and others may be used.

Example 3

Hexoxy-1-butadiene is dissolved in the same amount of benzene and heated with 1% of Floridin to the boiling point. The working up takes place as shown in Example 2. A light elastic mass is obtained.

Example 4

Ethoxy-1-butadiene is heated with 0.5% of zinc chloride to 60° C. under stirring. The resulting polymer is a thick, tough mass. Salts like aluminium chloride, iron chloride and other react similarly. The polymers are partly soluble, for the most part, however, they are unsoluble in the usual solvents like benzene, acetone, alcohol, ethyl-acetate, and the like.

Example 5

1% of kaolin is added to ethoxy-2-butadiene and heated up in a pressure vessel to 100° C. for 8 hours. A rubberlike polymer is obtained.

Example 6

2% of kaolin are added to a mixture of 9 parts by weight of ethoxy-1-butadiene and 1 part by weight of ethoxy-2-butadiene.

The polymerization is started by heating whereby the temperatures of the reaction must not be allowed to rise above 80° C. When the temperature begins to decrease the polymerization is finished by heating. The polymer is a light elastic mass.

Example 7

A molar amount of maleic anhydride is added to a solution of butoxy-1-butadiene in the double volume of benzene; the mixture is heated whereby the sulfur-yellow solution becomes colorless. The very viscous solution yields after the evaporation of the benzene a rubber-like elastic mass. The polymer is vulcanizable.

Without diluents the alkoxy-1-butadiene reacts so violently with maleic anhydride that decomposition takes place. The reaction may easily be regulated by the addition of inert diluents. The interpolymers with larger alcohol groups show better solubility than those with smaller ones. The solubility also depends on the course of reaction and the after-treatment. If the solution is evaporated by a higher temperature the products cannot be solved in such an easy manner. Products being soluble in a specially easy manner are obtained if the reaction is executed rapidly and with few solvents. The polymers swell extraordinary well in lyes; the low molecular products yield high viscous solutions. The anhydride groups of the polymers can be converted with compounds reacting generally with anhydride as for example alcohols, amines and the like, whereby derivatives of the interpolymers are obtained. In this way the properties of the polymers may be varied.

Example 8

Molar amounts of ethoxy-1-butadiene and maleic anhydride are polymerized in the same amount of benzene as in Example 7. Thereafter an amount of ethylene glycol, corresponding with 1 mol, is added and the mixture is boiled under reflux as long as a homogeneous solution is obtained. By evaporating the solvent the ester of the interpolymer is obtained.

Example 9

In a vessel equipped with a stirrer are 5 parts by weight of boiling benzene and 0.06 part by weight of kaolin. A mixture of 10 parts by weight of ethoxy-1-butadiene and a solution of 1 part by weight of maleic anhydride in 11 parts by weight of benzene is added dropwise. The polymerization is finished after 1 hour. A product of rubber-like properties is obtained after evaporating the solvent.

Example 10

Ethoxy-2-butadiene is brought to reaction with maleic anhydride in a boiling etheric solution. At the beginning of the reaction the solution is intensively yellow but when the polymerization proceeds the solution becomes lighter and lighter. A high elastic product is obtained after evaporating the solvent at 100° C. Another course of polymerization runs as follows: ethoxy-1-butadiene is dissolved in the same volume of benzene and the molar amount of maleic anhydride is added. After standing for 24 hours the yellow color disappears and a thick solution of the nearly colorless interpolymer is obtained.

Example 11

A slow current of oxygen is conducted at room temperature through butoxy-1-butadiene. After 12 hours a polymer in the form of a thick colorless oil is obtained out of which still some monomers may be removed by water steam. The oil has the property of drying and yields with the usual siccatives hardening films. Similar products are also obtained by the other alkoxy-1-derivatives of butadiene. The alkoxy-2-derivatives react correspondingly. The ethyl-glycolethers of the oxy-1-butadiene (boiling point 66–67° C./9 mm. $D_4^{20}$:0.8970, of intensive odor of cress) and the oxy-2-butadiene (boiling point 54–55° C./9 mm. $D_4^{20}$:0.8983, of aromatic odor but quite different from the odor of the 1-derivative) polymerize in a specially easy manner under the influence of air oxygen.

Example 12

Ethoxy-1-butadiene is boiled with 0.5% of benzoyl peroxide. After 30 hours a viscous fluid is obtained still containing partially unpolymerized ether.

Example 13

Pure ethoxy-1-butadiene is heated up to 120° C. in a pressure vessel. After 5 hours a thick colorless oil is obtained which is formed within a shorter time if the temperatures are higher.

Example 14

Oxygen is conducted at room temperature through cyclohexoxy-1-butadiene and the mixture is allowed to stand. After 3 days a thick colorless oil is obtained.

Example 15

1-α-ethyl-hexoxy-butadiene is treated with oxygen as shown in Example 14 and hereafter heated up to 100° C. After some hours a thick colorless oil is obtained. The same result is obtained with the n-hexoxy-derivative.

Example 16

100 parts by weight of ethoxy-1-butadiene are stirred with 200 parts by weight of petrolether and 1 part by weight of kaolin at 0° C. After 3 days the greater part is polymerized. The white polymer, unsoluble in petrolether, is separated from petrolether and extracted.

Example 17

Ethoxy-1-butadiene is heated up to 130° C. with half the amount of acrylic-nitril in a closed vessel for 6 hours. A thick oil of a slightly yellow color is obtained.

The invention claimed is:

1. The process of producing a plastic composition which comprises polymerizing the ethers of hydroxy-1-butadiene together with maleic anhydride.

2. The process for producing a plastic composition which comprises polymerizing 1-alkoxy-butadiene-1,3 by heating same to the boiling point in admixture with benzene and maleic anhydride.

PAUL HALBIG.
FRIEDRICH MATTHIAS.
ALFRED TREIBS.